United States Patent Office 3,200,116
Patented Aug. 10, 1965

3,200,116
PROCESS FOR THE PRODUCTION OF AZAPHENO-
THIAZINES CARRYING A SUBSTITUENT ON
THE PYRIDINE NUCLEUS
Albert Gross and Kurt Thiele, Frankfurt am Main, Germany, assignors to Deutsche Gold- und Silber-Scheideanstalt vormals Roessler, Frankfurt am Main, Germany
No Drawing. Filed Oct. 1, 1962, Ser. No. 227,535
Claims priority, application Germany, Oct. 3, 1961,
D 37,175
4 Claims. (Cl. 260—243)

The present invention relates to an improved process for the production of azaphenothiazines carrying a substituent on the pyridine nucleus of the formula

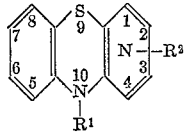

(I)

and preferably 4-azaphenothiazines carrying a substituent in position 2 of the pyridine nucleus of the formula

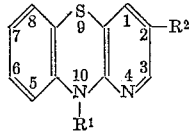

(II)

wherein $R^2$ is a halogen, lower alkyl, trifluoromethyl, nitrile, carboxyl, lower alkyl sulfonyl, lower alkanoic acyl, lower alkyl thio or a lower dialkyl sulfonamide group. Preferably $R^2$ is chlorine. $R^1$ preferably is hydrogen but also can be a further, preferably basically, substituted alkyl group with 2 to 4 C atoms. The basic substitutent on the alkyl group can be closed to the heterocyclic ring either with itself or with the alkyl group.

According to German Patent 964,056 it is known that 4-azaphenothiazines, if desired carrying a substituent on the benzene nucleus, can be prepared by heating the corresponding phenyl amino pyridine or substituted phenyl amino pyridine with sulfur or a sulfur yielding substance. German published application 1,102,752 describes a process for the production of 4-azaphenothiazines by converting a thioether of the formula

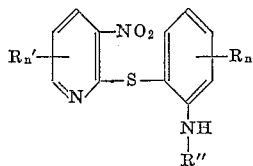

in a multistep process with ring closure with subsequent hydrolysis. German published application 1,102,753 and German Patent 1,095,288 describe a process according to which a thioether of the formula

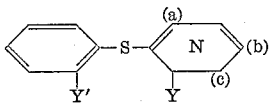

is converted to the corresponding azaphenothiazine with ring closure. In this formula one of Y' and Y designates halogen and the other an amino or substituted amino group.

All of these processes, however, have not proved satisfactory for the production of azaphenothiazines carrying a substituent on the pyridine nucleus thereof. Either the yields are too low or the starting materials are too difficult to produce.

According to the invention it was found that azaphenothiazines of the above Formula I carrying a substituent on the pyridine nucleus and particularly 4-azaphenothiazines of Formula II carrying a chlorine substituent in position 2 of the pyridine nucleus can be prepared in a simple manner and in good yields by treating a thioether of the formula

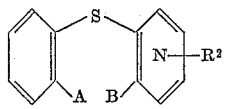

at an elevated temperature, preferably at about 150 to 310° C. in the presence or absence of a solvent with water or ammonia cleaving agent. In such formula $R^2$ has the same significance as above and one of A and B is —$NH_2$ or —NHR' and the other is hydroxy or also —$NH_2$ or —NHR'.

As water or ammonia cleaving agents, substances known for such purpose come into consideration, such as, for example, concentrated sulfuric acid, anhydrous zinc chloride, boron trifluoride and the like. Zinc in finely divided form can also be used for this purpose. Phosphoric acid is a preferred agent for cleaving ammonia or water. Expediently, such phosphoric acid is anhydrous and can be used in admixture with phosphorus pentoxide. It, however, also is possible to employ the phosphoric acid salt of the thioether as the starting material.

The azaphenothiazines prepared according to the invention can be employed as pharmaceuticals, as pesticides or as intermediates in the production of other compounds. Primarily concerned are those which are unsubstituted in position 10 ($R'_2H$) and these serve as starting materials for the production of other azaphenothiazines carrying a substituent in position 10.

The following examples will serve to illustrate the invention with reference to several specific embodiments thereof.

Example 1

40 g. of the phosphate salt prepared from 29 g. of 2-(5'-chloro-2'-amino-3'-pyridyl mercapto)-phenyl amine were heated for 30 minutes under a nitrogen atmosphere to 270° C. while stirring. After the reaction mixture had cooled to 150° C. it was taken up in 100 cc. of propylene glycol. The solution was diluted with 400 cc. of toluene and washed once with water. The toluene solution was dried with $K_2CO_3$ and the solvent evaporated off. The residue was suspended in isopropanol, suction filtered and dried. The yield of the thus obtained 2-chloro-4-azaphenothiazine was 15 g.=58% of the theoretical. Its melting point was 183° C.

Example 2

3 g. of 2-(5'-chloro-2'-hydroxy-3'-pyridyl mercapto)-phenyl amine were well triturated with 1 g. of zinc powder. The mixture was melted (230–240° C.) and subsequently distilled using a heating bath temperature of 300–310° C. under a pressure of 30 torr. The distillation temperature was 250° C. 1 g. of 2-chloro-4-azaphenothiazine distilled over which corresponded to a yield 38% of the theoretical (melting point 183° C.).

We claim:
1. Process for the production of 2-chloro-4-azaphenothiazine which comprises heating a compound of the formula:

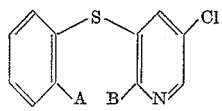

wherein one of A and B is —$NH_2$ and the other is selected from the group consisting of —$NH_2$ and —OH in the presence of a cleaving agent selected from the group consisting of finely divided zinc and acid condensing agents at a temperature between about 150° C. and 310° C.

2. The process of claim 1 in which said cleaving agent is powdered zinc.

3. Process for the production of 2-chloro-4-azaphenothiazine which comprises heating a compound of the formula

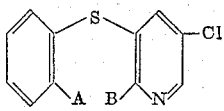

in which both A and B are —NH₂ in contact with an anhydrous phosphoric acid at a temperature between about 150 and 310° C.

4. Process for the production of 2-chloro-4-azaphenothiazine which comprises heating the phosphate salt of 2-(5'-chloro-2'-amino-3'-pyridyl mercapto)-phenyl amine to a temperature between about 150 and 310° C.

References Cited by the Examiner

FOREIGN PATENTS 549,055   12/56   Belgium.

OTHER REFERENCES

Elsevier: "Chemistry of Carbon Compounds," vol. IVC, page 1514, Elsevier Publishing Co. (N.Y.), 1960.

Hollins: "Synthesis of Nitrogen Ring Compounds," pages 177 and 333 to 336, D. Van Nostrand Co. (N.Y.), 1924.

Olmsted et al.: J. Org. Chem., vol 26, pages 1901–1907 (June 1961).

WALTER A. MODANCE, *Primary Examiner.*

JOHN D. RANDOLPH, *Examiner.*